Aug. 8, 1939.  H. SCHMIDT  2,169,128
METHOD OF PRODUCING HYDROGEN PEROXIDE FROM SOLUTIONS
Filed June 2, 1938
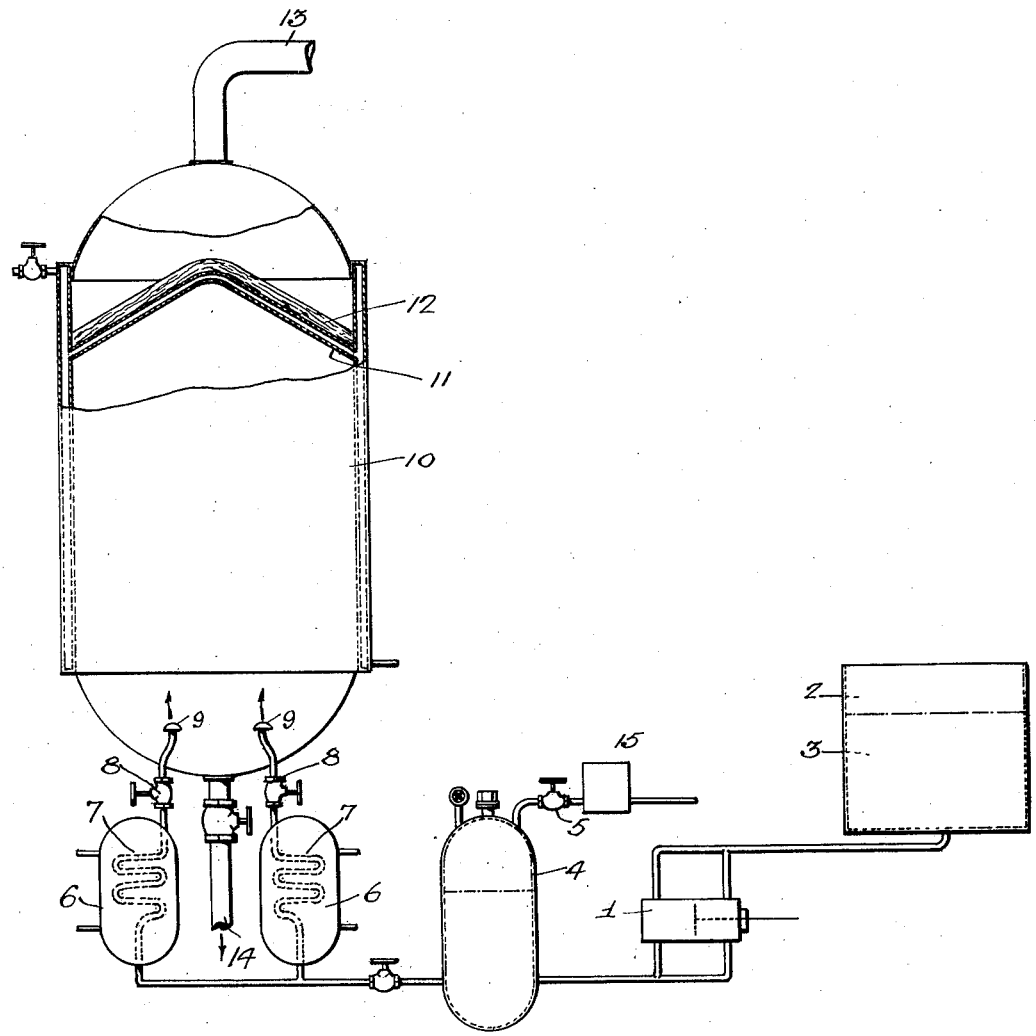
Inventor.
Heinrich Schmidt
By his Attorneys
Howson & Howson Patented Aug. 8, 1939

2,169,128

UNITED STATES PATENT OFFICE 2,169,128

METHOD OF PRODUCING HYDROGEN PEROXIDE FROM SOLUTIONS

Heinrich Schmidt, Walddorf, Germany, assignor to The Pennsylvania Salt Manufacturing Company, Philadelphia, Pa., a corporation of Pennsylvania Application June 2, 1938, Serial No. 211,463
In Germany April 2, 1935

10 Claims. (Cl. 23—207)

This invention relates to a method of producing hydrogen peroxide from solutions from which hydrogen peroxide is liberated upon heating.

The production of hydrogen peroxide by distillation methods is known to be difficult since the reaction velocities of the individual reactions which, together, comprise the distillation proceed at different rates. For instance, in the distillation of persulphate solutions, the hydrolysis of the persulphate proceeds faster than the separation of the peroxide, with the consequence that impurities in the solution have time to act as decomposing catalysts. For this reason, usual distillation processes cannot be used advantageously.

I have discovered that the production of hydrogen peroxide from solutions, including those which may contain substantial amounts of impurities, is simple, and good yields may be obtained if the solution, preferably containing stabilizing agents, is heated, while under elevated pressure due to suitable inert gases, including gases having a stabilizing action on the active oxygen compound in the solution, such as oxygen either pure or in a gaseous mixture such as air, and atomized into a chamber in which a lower pressure is maintained. The heating of such solutions to a high temperature has ordinarily been considered to be impossible, but I have discovered that if the pressure is increased with the elevation of the temperature and only a portion of the solution is heated, immediately prior to the distillation thereof, the destruction of the molecule due to heat is avoided, thus preventing any substantial loss of active oxygen.

In accordance with my process, the solution at high pressure is atomized suddenly and very rapidly and as a result exists in the distilling chamber in a finely divided form, whereupon immediate volatilization of the peroxide takes place as soon as it is formed, and no substantial loss of active oxygen is encountered.

For this reason, catalysts, or other undesirable influences can no longer disturb the distillation and the process can be operated continuously without difficulty. There is, furthermore, a greater choice of the materials of construction in the apparatus than in the case of the usual processes due to the formation and separation of the peroxide in free space and the elimination of highly heated surfaces with which it can come in contact.

Since the solutions can be distilled without fear of the formation of a residue of a crystalline nature, solutions can be utilized having a high salt content, such as concentrated solutions of percompounds (persulphate, perborate, etc.) produced by electrolytic oxidation. In fact, the method is applicable to the distillation of any solutions yielding hydrogen peroxide upon heating, such as a solution of persulphuric acid, solutions of hydrogen peroxide which have been produced by the cathodic reduction of oxygen in electrolytic cells under pressure or any other method and solutions of hydrogen peroxide which it is desired to redistil. All of these solutions are included within the term "a solution containing an active oxygen compound capable of liberating hydrogen peroxide upon heating". The solution may advantageously contain a stabilizing agent as, for example, phosphoric, barbituric or uric acids in amounts of .01 to .1 by weight, or mixtures thereof.

In the accompanying drawing, I have illustrated diagrammatically one form of apparatus for carrying out the process of my invention. Pump 1 sucks the solution 3 from container 2 and forces it into pressure vessel 4. Inert or stabilizing gases are led into the solution from a container or compressor (not shown) through pressure regulator 15 and valve 5. The pressure provided in vessel 4 depends upon the character of the solution and degree of heating which is necessary to cause volatilization in chamber 10, for example, from 5 to 65 atmospheres, preferably from 25 to 55 atmospheres. The solution is conveyed to heater 6 from pressure vessel 4, and as many heaters can be connected to a single pressure vessel as desired. Each heater 6 comprises, for example, a straight tube (or a tube in the form of a spiral) 7 of small cross section in order that the small quantity of liquid flowing through it can rapidly be brought to the desired temperature. The range of temperature that may be employed in heaters 6 may vary, for example, from 200° C. to 400° C., preferably between 300° C. and 400° C. The solution under pressure flows immediately upon being heated to the desired point through control valve 8 to atomizer 9 which discharges in a very finely divided state into the chamber 10, the walls of which are heated. The pressure maintained in the chamber 10 depends upon the temperature and pressure of the solution delivered to the chamber and is sufficient so that the solution volatilizes immediately upon entering the chamber. The pressure in chamber 10, for example, may be atmospheric or from 25 to 250 millimetres of mercury absolute. In the upper part of the chamber 10, there is a heated grille 11 which carries a filtering or spray removing mat 12. The heating of the walls of the chamber and the grille is provided so that appreciable condensation is avoided. If desired, tower packing, such as Raschig rings or the like, may be placed above the grille 11 and/or adjacent the bottom of the chamber on which any of the non-volatile liquid may precipitate. Steam may be admitted to the chamber at any point, for example adjacent the bottom and/or adjacent the grille to supply heat to the packing to liberate any hydrogen peroxide from the precipitate that may not have been vaporized in the process. The vapors which have been released leave the chamber at 13 and enter the usual type of condensing equipment. The residue can be withdrawn through pipe 14.

From the foregoing, it is clear that the process of the invention involves applying pressure by means of a gas inert (possessing a stabilizing effect, if desired) to the active oxygen compound in a solution capable of yielding hydrogen peroxide upon heating. The solution may advantageously contain a stabilizer for hydrogen peroxide. The solution is then heated while under pressure and the pressure is then released under conditions causing vaporization of the hydrogen peroxide. The conditions are preferably also such that there is substantially no loss of active oxygen and no appreciable amount of condensation of the released vapors. The release of pressure is preferably brought about by atomizing the solution into a chamber maintained at a lower pressure than that of the solution. Generally the chamber will be maintained under a vacuum. The vapors are separated from the non-volatile portion of the liquid and the vapors are thereafter recovered in any desired manner.

Considerable modification is possible in the steps of the method as well as in the physical conditions present in any particular step without departing from the essential features of my invention.

I claim:

1. The method of producing hydrogen peroxide which comprises applying to an aqueous solution, containing an active oxygen compound capable of yielding hydrogen peroxide upon heating, pressure by means of a gas inert to said active oxygen compound, heating the solution while under pressure, suddenly releasing the pressure to vaporize the hydrogen peroxide, separating the vapors from the non-volatilized portion of the liquid, and subsequently recovering the vapors.

2. The method of claim 1 wherein the inert gas has a stabilizing effect on the active oxygen compound in said solution.

3. The method of claim 1 wherein the solution treated contains a stabilizer for hydrogen peroxide.

4. The method of claim 1 wherein the release of pressure takes place in a chamber wherein a temperature is maintained to prevent condensation of an appreciable amount of the released vapors.

5. The method of claim 1 wherein the heated solution under pressure is atomized into a chamber maintained at a pressure below atmospheric pressure wherein a temperature is maintained sufficient to prevent condensation of an appreciable amount of the released vapors.

6. The method of producing hydrogen peroxide which comprises applying to an aqueous solution, containing an active oxygen compound capable of yielding hydrogen peroxide upon heating, pressure by means of a gas having a stabilizing effect on the active oxygen compound in said solution, heating the solution while under pressure, atomizing said solution into a chamber maintained at a lower pressure to vaporize the hydrogen peroxide with substantially no loss of active oxygen and without an appreciable amount of condensation of the released vapors, separating the vapors from the non-volatilized portion of the liquid, and subsequently recovering the vapors.

7. The process of claim 6 wherein the pressure in the chamber is below atmospheric pressure.

8. The process of claim 6 wherein the solution treated contains a stabilizer for hydrogen peroxide.

9. The method of producing hydrogen peroxide which comprises applying to an aqueous solution, containing an active oxygen compound capable of yielding hydrogen peroxide upon heating, a pressure from 5 to 65 atmospheres by means of a gas having a stabilizing effect on the active oxygen compound in said solution, heating the solution while under said pressure to a temperature from 200° C. to 400° C., atomizing said solution into a chamber mantained at a lower pressure to vaporize the hydrogen peroxide, separating the vapors from the non-volatilized portion of the liquid, and subsequently recovering the vapors.

10. The process of claim 9 wherein the pressure in the chamber is from 25 to 250 millimeters of mercury absolute.

HEINRICH SCHMIDT.